(12) United States Patent
Weber

(10) Patent No.: US 6,253,525 B1
(45) Date of Patent: Jul. 3, 2001

(54) HINGE DEVICE FOR SWIVELLING ASSEMBLY OF MOUNTING ELEMENTS FOR VEHICLES

(76) Inventor: Gisela Weber, Hauptplatz 23, A-2474 Gattendorf (AT)

( * ) Notice: Subject to any disclaimer, the term of this patent is extended or adjusted under 35 U.S.C. 154(b) by 0 days.

(21) Appl. No.: 09/462,954

(22) PCT Filed: Jul. 14, 1998

(86) PCT No.: PCT/AT98/00170

§ 371 Date: Jan. 31, 2000

§ 102(e) Date: Jan. 31, 2000

(87) PCT Pub. No.: WO99/03717

PCT Pub. Date: Jan. 28, 1999

(30) Foreign Application Priority Data

Jul. 14, 1997 (AT) .................................................. 1201/97

(51) Int. Cl.[7] ........................................................ E04C 3/00
(52) U.S. Cl. .................. 52/735.1; 52/71; 52/64; 52/730.5; 52/730.4
(58) Field of Search .......................... 52/735.1, 730.5, 52/730.4, 64, 65, 69, 71, 716.5; 296/55, 100.06, 108, 146.11; 403/220

(56) References Cited

U.S. PATENT DOCUMENTS 3,646,636  3/1972  Hives ..................................... 16/140
4,460,030  7/1984  Tsenemura et al. .................... 160/35
5,107,639  4/1992  Morin et al. ............................. 52/71

FOREIGN PATENT DOCUMENTS 7205506  10/1972  (FR) .............................. B62D/25/00

*Primary Examiner*—Christopher T. Kent
*Assistant Examiner*—Jennifer I. Thissell
(74) *Attorney, Agent, or Firm*—Karl Hormann

(57) ABSTRACT

Hinge arrangement for pivotally connecting structural parts (1) which in oppositely inclined surfaces facing each other are provided with an open-ended T-shaped undercut elongate groove (3) in which may be inserted from the ends of the groove at least one support component (4) with lugs (4") corresponding to the cross-section of the groove and with a cylindrical receptacle (4') for insertion of the hinge axle (L), the support components cooperating with at least one unitary hollow pivot profile (5) arranged between the structural parts and provided with inclined walls (5') corresponding to the inclined walls of the structural parts and adjacent to the cylindrical receptacles of the support components (4) with two partially cylindrical receptacles (7) into which may be inserted the hinge axle (L) extending through the receptacles of the structural parts so that one or both structural parts may be pivoted by 90° or one of the structural parts may be pivot by 180° relative to the other.

8 Claims, 2 Drawing Sheets

HINGE DEVICE FOR SWIVELLING ASSEMBLY OF MOUNTING ELEMENTS FOR VEHICLES

BACKGROUND OF THE INVENTION

1. Field of the Invention

The invention relates to a hinge arrangement for pivotally connecting structural parts of a vehicle which are pivotal relative to each other and, particularly, parts of a vehicle platform.

2. The Prior Art

In the construction of vehicular components, especially vehicle platforms, tailgates etc. extrusion molded hollow profiles made of aluminum are being used increasingly. The hollow profiles include structural parts which are pivotally or foldably connected to each other. To this end, it has hitherto been necessary to attach to the hollow profiles by means of screws support flanges, hinges or the like provided with cylindrical receptacles for the pivot axle or pivot bolt. Such a measure represents a considerable additional expense in terms of labor and material.

OBJECTS OF THE INVENTION

For that reason, the invention aims at providing a hinge arrangement which makes possible a simple and substantially modular construction of pivotal hinges without requiring threaded connections and the like.

BRIEF SUMMARY OF THE INVENTION

The hinge arrangement in accordance with the invention is characterized by the fact that the structural parts to be connected to each other and which preferably consist of extrusion molded hollow aluminum profiles are provided with a T-shaped undercut elongate groove in each of a pair of front walls facing each other in opposite inclinations. At least one support component provided with lugs complementary to the cross-section of the groove and with a cylindrical receptacle for a hinge axle is insertable into the groove from an end thereof, the support components cooperating with at least one unitary hollow pivot profile disposed between the structural parts. The pivot profile is provided with inclined walls corresponding to the inclined walls and, adjacent to the cylindrical receptacles of the support components, partially cylindrical receptacles into which may be inserted the hinge axles extending through the receptacles of the support components so that one or both structural parts may be pivoted by 90°, or one components may be pivoted by 180° relative to the other one.

The construction in accordance with the invention makes it possible seriatim to insert into the elongate grooves of the facing inclined walls of the structural parts or, in particular, hollow profiles, from the ends thereof, the required number of support components and pivot profiles as well as additional spacers, until the elongate grooves are occupied over their entire length. The parts adjacent to the ends of the grooves are secured by clamp screw, pins, adhesion or the like. Thereafter, the hinge axles or bolts may be inserted into the aligned receptacles of the support components and of the pivot profile.

Preferably, the inclined front walls of the structural parts to be connected and the pivot profile are provided with abutments the faces of which will engage each other when the structural parts are in their 90° pivotal disposition. This ensures flawless pivotal movement, in particular the one about 180°, and pivotal disposition of the structural parts of the vehicle relative to each other. In accordance with a further characteristic of the invention, there are provided within the elongate grooves, over the length of the structural parts to be connected, several support components which are separated by pivot profiles and, preferably, by spacers.

In the context of the invention the pivot profile is symmetrically structured and is provided with a lower chamber limited by its inclined walls and a lower transverse wall as well as with upper partially cylindrical receptacles which at an upper portion are provided with abutments for limiting pivotal movement.

DESCRIPTION OF THE DRAWINGS

Further characteristics of the invention will hereinafter be described on the basis of an embodiment and with reference to the drawings, in which.

DETAILED DESCRIPTION OF PREFERRED EMBODIMENTS

Figure 1:
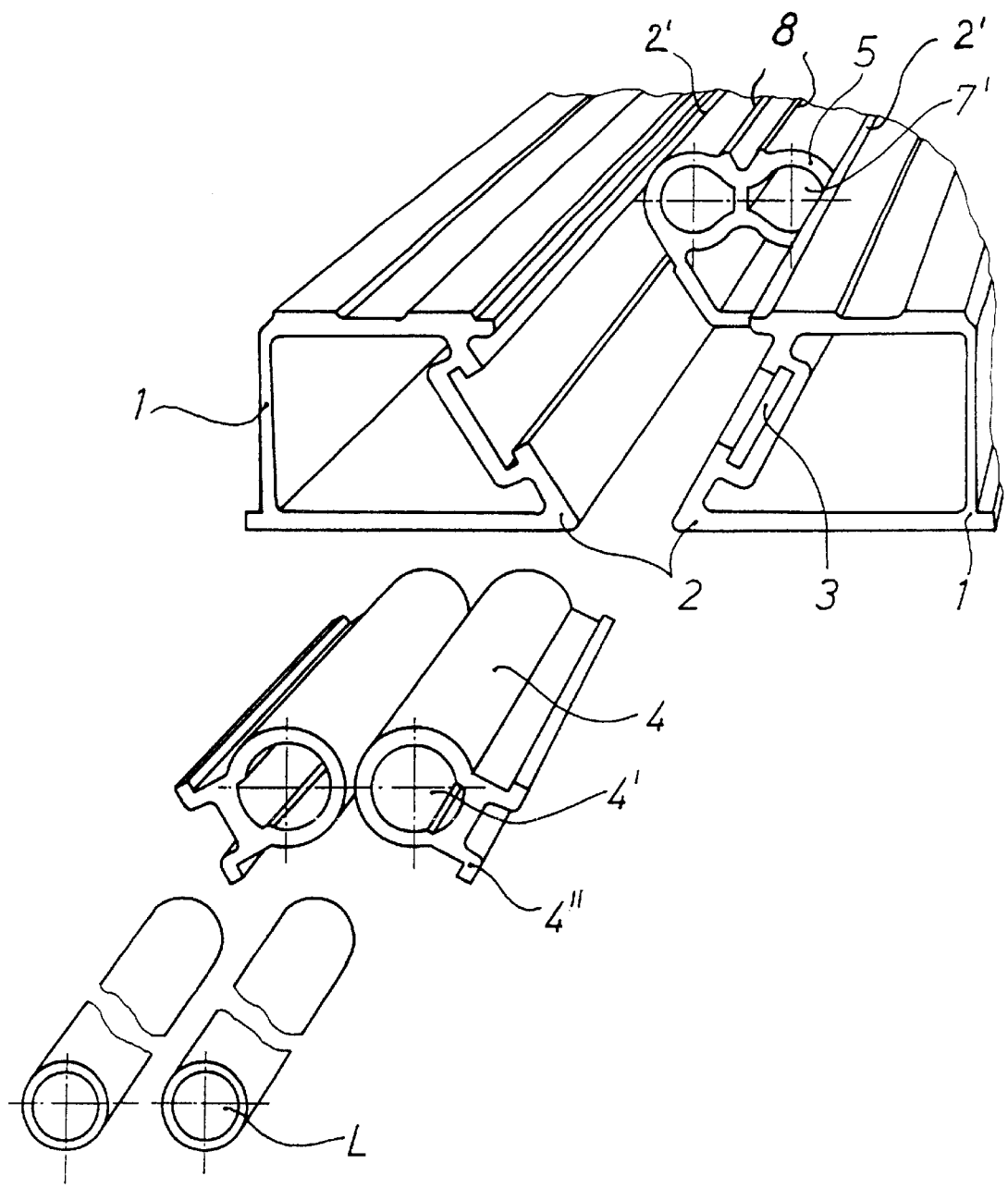
FIG. 1 is a perspective view in section of the hinge arrangement of the platform of a vehicle.

FIG. 1 depicts two structural parts 1 of a platform of a vehicle consisting of extrusion molded hollow aluminum profiles. Within each of the front surfaces 2 of the structural parts 1 which with further hollow profiles not shown and which are disposed in facing relationship at some distance from each other and in opposite inclinations there is formed a T-shaped undercut elongate groove 3 for inserting support components 4 from the ends of the groove. The support components 4 are provided with a cylindrical receptacle 4' for a hinge axle L and lugs 3 which complement the elongate groove 3.

As many support components 4 as are required are inserted into the elongate grooves 3. The support components 4 are secured relative to each other over the length of the groove by spacers which are inserted into the elongate grooves and of which at least one constitutes a pivot profile 5. The components adjacent to the ends of the grooves are secured by locks, such as clamping screws or pins, or by adhesion. In addition to the pivot components 5 other spacers may also be provided.

Figure 2:
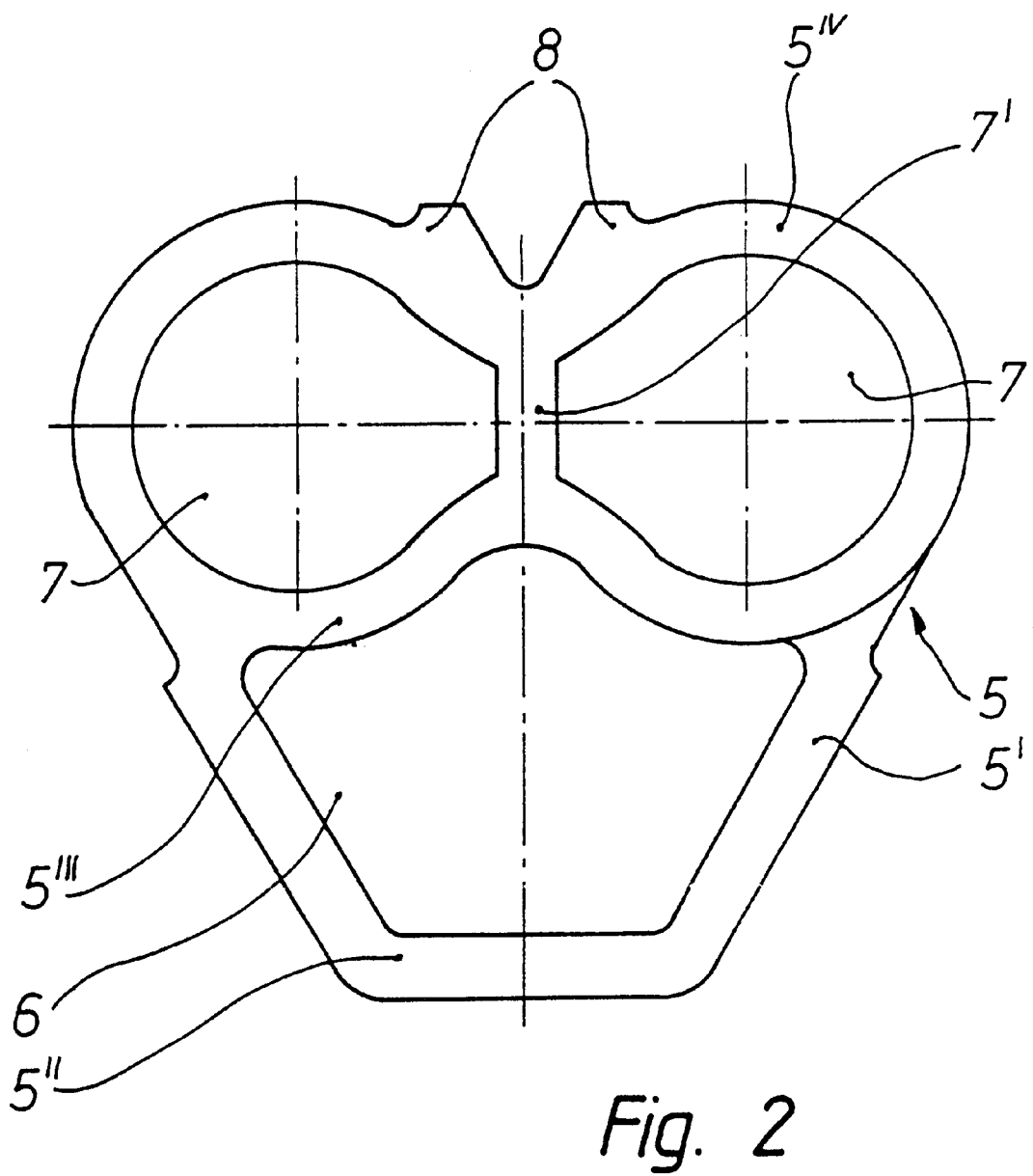
FIG. 2 is a front view of a pivot profile.

FIG. 2 presents a frontal view of the pivot profile 5. The pivot profile is symmetrically structured and is provided with inclined walls 5' corresponding to the inclined walls 2 in their substantially V-shaped disposition of the structural parts 1. The pivot profile 5 is provided with a lower chamber 6 formed by the inclined walls 5' and a lower transverse wall 5'' as well as an intermediate transverse wall 5''', and also two partially cylindrical receptacles 7 formed by the intermediate transverse wall 5''' and an upper wall $5^{IV}$ as well as by a profile brace 7'. The receptacles 7 serves to receive the hinge axle L inserted into the aligned receptacles 4' and 7 of the support components 4 and the pivot profiles 5.

On the upper wall $5^{IV}$ the are provided two symmetrical abutments 8 which define between them a V-shaped groove. The structure shown requires no screwed connection of any kind of support components and pivot profiles at the hollow profiles of the structural parts.

During operation, one or both platform components may be pivoted 90° relative to each other, or one of the components may be pivoted by 180°. In the 90° pivotal position the abutments 2' at the upper ends of the inclined walls 2 of the structural parts 1 engage the faces of the abutments 8 of the pivot profile 5. This ensure a flawless pivoting by 180°.

The invention is suitable for all components of a vehicular structure which a pivotal relative to each other.

What is claimed is:

1. A hinge arrangement, comprising:
    a first structural part comprising an oblique surface of predetermined inclination with an open-ended undercut elongate groove of substantially T-shaped cross-section extending therealong;
    a second structural part comprising an oblique surface an inclination opposite the predetermined inclination with an open-ended undercut elongate groove of substantially T-shaped cross section extending therealong;
    at least one elongate pivot member provided with first and second inclined surfaces substantially corresponding and respectively aligned in parallel to the inclined surfaces of the first and second structural parts and provided with first and second receptacles extending parallel to each other;
    a first support component comprising a lug configured to be slidably received through an open end in the elongate groove of one of the first and second structural parts and a receptacle adapted to be axially aligned with one of the first and second receptacles;
    a second support component comprising a lug configured to be slidably received through an open end in the elongate groove in the other of the first and second structural parts and a receptacle adapted to be axially aligned with the other of the first and second receptacles;
    a first pivot axle adapted to be received in the first receptacle and the receptacle of one of the first and second support components; and
    a second pivot axle adapted to be received in the second receptacle and the receptacle of the other of the first second support components.

2. The hinge arrangement of claim 1, wherein the first and second support components are disposed parallel to each other.

3. The hinge arrangement of claim 2, wherein the first and second structural parts and the first and second support components are provided with matching abutments for limiting pivotal movement of the first and second structural parts to 90° each.

4. The hinge arrangement of claim 2, wherein one of the first and second structural parts is pivotable by 180°.

5. The hinge arrangement of claim 2, wherein a plurality of axially aligned support components are provided in the elongate grooves.

6. The hinge arrangement of claim 5, further comprising a plurality of axially aligned pivot members and wherein the support components are disposed alternatingly with the pivot members.

7. The hinge arrangement of claim 6, further comprising spacer members between the pivot members and the support components.

8. The hinge arrangement of claim 6, further comprising means at the open ends of the elongate grooves for preventing any of the support components and the pivot members from escaping.

* * * * *